(12) United States Patent
Hammell

(10) Patent No.: US 8,051,014 B2
(45) Date of Patent: *Nov. 1, 2011

(54) METHOD FOR PROVIDING A SHORTCUT TO SHIPPING INFORMATION

(75) Inventor: Bradley R. Hammell, Fairfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 2685 days.

This patent is subject to a terminal disclaimer.

(21) Appl. No.: 10/722,231

(22) Filed: Nov. 25, 2003

(65) Prior Publication Data

US 2005/0114236 A1 May 26, 2005

(51) Int. Cl.
*G06Q 30/00* (2006.01)

(52) U.S. Cl. .......................... 705/333; 705/330; 705/341

(58) Field of Classification Search ...................... 705/26
See application file for complete search history.

(56) References Cited

U.S. PATENT DOCUMENTS

| | | | |
|---|---|---|---|
| 6,463,420 B1 | 10/2002 | Guidice et al. | |
| 6,965,868 B1 * | 11/2005 | Bednarek | ........................ 705/9 |
| 7,020,584 B2 | 3/2006 | Takaoka et al. | |
| 7,112,500 B2 | 9/2006 | Ando et al. | |
| 7,191,142 B1 | 3/2007 | Sandell et al. | |
| 7,212,829 B1 | 5/2007 | Lau et al. | |
| 7,660,721 B2 | 2/2010 | Williams et al. | |
| 7,693,964 B2 | 4/2010 | Hancock et al. | |
| 2002/0032573 A1 * | 3/2002 | Williams et al. | .................. 705/1 |
| 2002/0082893 A1 | 6/2002 | Barts et al. | |
| 2002/0116241 A1 | 8/2002 | Sandhu et al. | |
| 2004/0024644 A1 | 2/2004 | Gui et al. | |
| 2004/0024658 A1 | 2/2004 | Carbone et al. | |
| 2004/0024660 A1 | 2/2004 | Ganesh et al. | |
| 2005/0251330 A1 * | 11/2005 | Waterhouse et al. | ......... 701/204 |
| 2006/0053027 A1 | 3/2006 | Riggs et al. | |
| 2007/0168263 A1 | 7/2007 | Hammell | |
| 2008/0040144 A1 | 2/2008 | Riggs et al. | |

OTHER PUBLICATIONS

Businessworld: DHL Launches SMS, WAP Tracking Service, Manila, Apr. 25, 2000, p. 1.*
DHL: Corporate—Package Tracking, Feb. 2, 2001.*
DHL Airways, Apr. 5, 2001.*
Oct. 28, 2010 Office Action and Aug. 10, 2010 Amendment in U.S. Appl. No. 10/580,484, 16 pages.

* cited by examiner

*Primary Examiner* — Alum Ullah
*Assistant Examiner* — Fahd A Obeid
(74) *Attorney, Agent, or Firm* — George M. Macdonald; Charles R. Malandra, Jr.; Steven J. Shapiro

(57) ABSTRACT

A method and system are provided for a user to determine the status of a shipment being transported by a carrier. The user performs a transaction at a web site, and chooses a type of shipment. A file in markup language includes at least one link to shipment tracking information, and this file is provided to the user and saved locally at a user device. The user activates the file to check the shipping status, which is then displayed. In this way, the user is able to access aggregated shipping information from a plurality of carriers. Also, the user is able to obtain pinpoint shipping status, if the user needs more details than merely finding out a checkpoint through which a shipment has passed.

9 Claims, 4 Drawing Sheets

METHOD FOR PROVIDING A SHORTCUT TO SHIPPING INFORMATION

TECHNICAL FIELD

The present invention relates to package delivery, and in particular to status inquiries regarding delivery of shipments.

BACKGROUND

People who use online merchants or delivery companies with online access usually have at least two possible methods to track and confirm delivery of packages or other items. According to the first method, users must remember a unique—and usually difficult to remember—tracking identifier. Such a tracking code is normally a string of letters and/or numbers that have no easily remembered meaning. According to a second alternative method, the user must go through a time-consuming authentication process in order to access the tracking identifier, or in order to directly access the tracking information. Plainly, either of these two methods has drawbacks.

If the shipment was initiated in conjunction with a purchase, then the user can authenticate to the merchant web site where the user made the purchase, but less time spent authenticating normally means less security for the customer. Following a lengthy authentication, the user would then see a merchant's or shipping carrier's display of the tracking identifier as a hypertext shortcut directly to the tracking information, or a display of the tracking information itself, or the user would see a query for even more information if the merchant has not automatically provided that information to the carrier. Thus, the existing art has not yet achieved a satisfactory alternative to memorization of long tracking identifiers.

SUMMARY OF THE INVENTION

The present application describes an illustrative process that is as convenient as activating a script or executable file, in order for a user to check and verify shipping status. For instance, at the time of a transaction, the company (i.e. a merchant, carrier, or related business) will formulate a small html page that is capable of redirecting the user to the carrier's web site with the query and tracking identifier already entered. The user is then given the option to save this small html page on the user's desktop or other local storage area. From then on, the user just double clicks that html file, and current shipping information is displayed without any need for the user to memorize a tracking identifier or spend time authenticating.

An illustrative embodiment of the application has at least two advantages. First, it eliminates the need of users remembering long and arcane tracking identifiers. Second, it eliminates the need of users taking time to provide authentication information in order to log into secure web sites for the purpose of checking a shipping status.

An illustrative embodiment of the application is well-suited to a situation in which a user is tracking more than one shipment, either using a single carrier or a plurality of carriers. In the latter case, at least some shipping data is aggregated so that a user is able to quickly and easily access shipping status from two or more carriers.

According to a preferred embodiment of this invention, when a user clicks on a desktop icon or other hyperlink, the user is not only provided delivery status, but is also provided with the opportunity to have delivery status updated. For example, a carrier will already typically update delivery status when the package arrives at a discrete set of points A, B, C, D, and E. The illustrative embodiment of the application allows the user to find out where the item is between, for example, points A and B or between points B and C. This is accomplished, for example, by having GPS units on vehicles. Advantageously, the user is provided one free access to the system, and then has to pay for further clicks in order to get this deluxe pinpoint tracking information within a certain time of clicking the icon or hyperlink. In contrast, there is normally no need to charge extra for arrival status at the discrete checkpoints A, B, C, D, and E.

DETAILED DESCRIPTION

Figure 1:
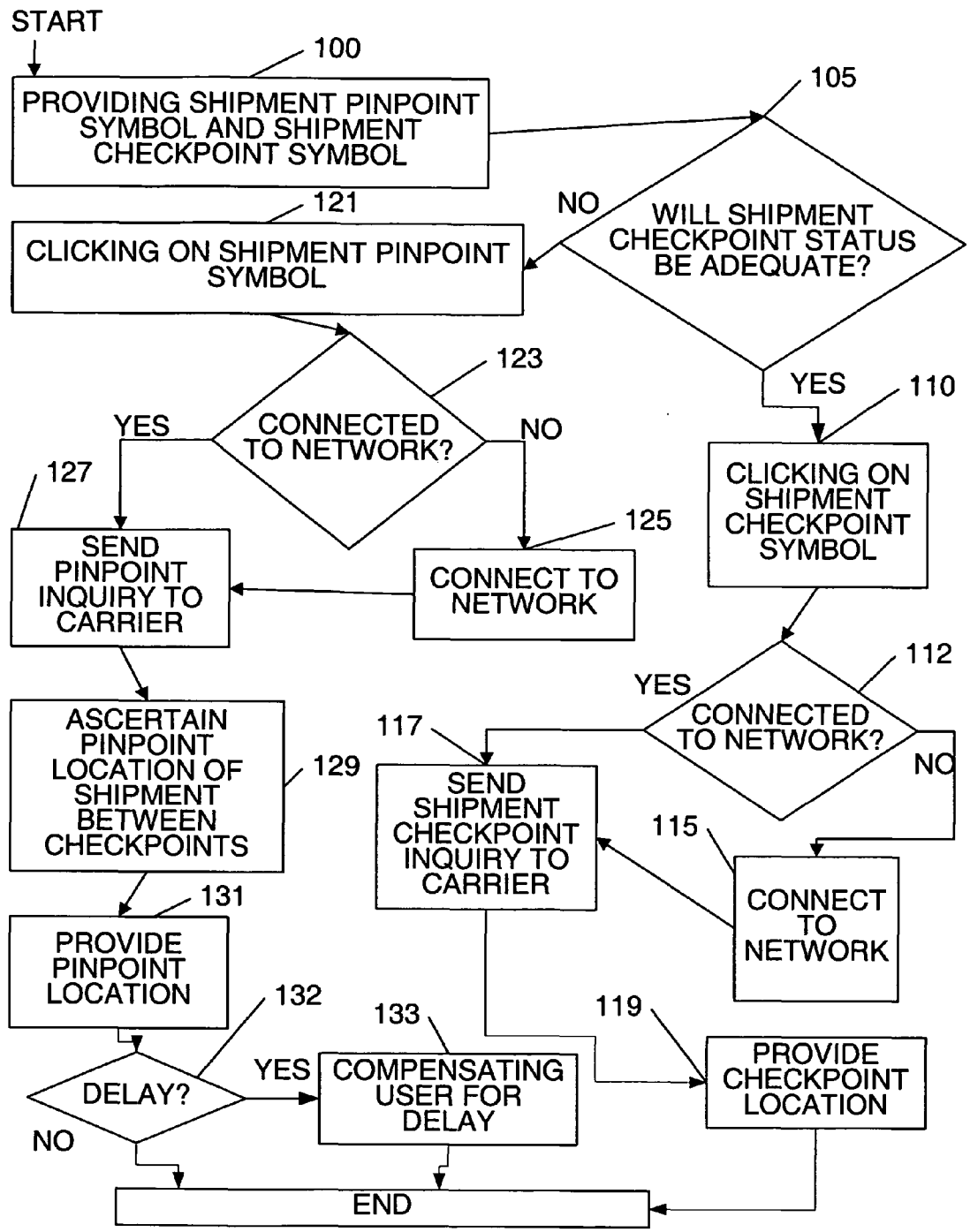
FIG. 1 is a flow chart showing how a user can obtain checkpoint shipping status or pinpoint shipping status.

An illustrative embodiment of the present invention begins when the user completes his or her transaction in a normal way at a web site, and then chooses a shipping option. Then, the web site processes the transaction, creates a small html file, and sends that file to the user who will save it locally. The content of the html file will look like the following:

```
<html>
    <head>
        <meta http-equiv="Content-Type" content="text/html">
        <meta http-equiv="refresh"
content="0;url=http://www.shipco.com/tracking/track.asp?no='ASB7F126UHS'">
    </head>
    <body>
    </body>
</html>
```

The user then saves this html file locally in a convenient place. When the user wants to check the status of a package, the user will double click on the html file. The html file redirects the user appropriately to the tracking page showing the status of their package.

Extensions and more advanced embodiments can be implemented. For example, to be expandable, a web site can combine all the current valid tracking identifiers each time a user ships another package. The user is then asked to replace his html file with a new one, which would contain all previous tracking numbers (minus any that are not relevant anymore)

plus the user's new tracking identifier. This is feasible if all the packages are shipped from the same carrier. If all items are not with the same carrier, then a company could create another web page that buffers all the requests to the multiple carriers, so the redirect actually sends all the tracking identifiers to a web page which is scripted to ascertain which carrier goes with which identifier, and returns the results all on one page. This extension could be implemented as a web service.

Another extension is to have a small client application that goes out and polls the carriers' sites regarding the tracking information. Then, when a new item is shipped, the user can add it to his list of currently tracked items, via a file-type association download that automatically puts it in the client application, or via a manual addition. Alternatively, item information is downloaded as an html file in the way described above, but the small client application goes through a directory and scans all the html files in the directory for tracking identifiers.

The file that redirects the end user can be implemented in various scripting languages, including markup languages such as html. Moreover, the company web site can actually continue to buffer the user from the carriers, by redirecting them to their web sites and submitting the multiple queries for tracking on behalf of the user. Because of this, the company can list the shipping status of all current packages. Another alternate approach is for the file to redirect using Hypertext Transfer Protocol Secure ("https") to provide a higher level of confidentiality. In an additional alternative embodiment, the web site only provides the option of downloading the shortcut file to the end user, instead of sending it directly.

Some more advanced implementations of the present invention use a heavy client on a user's computer. A "listener" process wakes up when the user receives a tracking identifier in a web page, or when a user goes to a carrier's web site. Note that most carriers have a unique structure to their tracking identifier, which potentially facilitates recognition of incoming tracking identifiers. After waking up, the heavy client program continues to run as a background process, and polls the carriers' web sites so as to notify the user with a message when a package reaches certain user-configurable conditions.

This type of implementation can, for example, poll at 15-minute intervals after the status has been changed (to "out for delivery" for instance). A message would then pop up onscreen when a GPS unit in a delivery vehicle returns a coordinate within a set distance from the user's house. That way the user will know that a delivery will be arriving imminently, and will be able to make plans accordingly.

Of course, all of the foregoing internet or network interaction can be done over a Secure Sockets Layer (SSL) or other cryptographically secured channel giving the end user confidentiality of their shipping queries. This would also ensure that thieves will not be able to easily intercept the pinpoint location of a delivery vehicle. The down side to having a secure connection is that accessing it can be time-consuming, and the embodiments of the present application addresses this problem by streamlining the user access.

The illustrative embodiments of the present application can be more fully appreciated by reference to the accompanying figures. As seen in FIG. 1, a user is provided 100 with a shipping pinpoint symbol and a shipping checkpoint symbol. These may be icons on the user's desktop, or they may be located in a computer file folder. The user (e.g. a customer) decides 105 whether checkpoint status will be adequate.

In other words, the user decides whether he or she needs more precise pinpoint information about shipment status, instead of merely finding out which checkpoint was the most recent one that the shipment passed through. If checkpoint status is sufficient, then the user clicks 110 on the checkpoint symbol. Then it is determined 112 if the user is already connected to the network (e.g. the internet), preferably via a secure connection. If not, then such a connection is established 115. When the connection is in place, a checkpoint inquiry is sent 117 to the shipping carrier, and the carrier provides a checkpoint location to the user. Subsequently, the user is able to repeat this procedure.

If, at step 105, the user decides that more precise shipping status is desired, then the user clicks 121 on the shipment pinpoint symbol which may be available on the user's desktop or in a folder in the user's computer, or additionally may be available at a carrier's web site that has been accessed by previously having clicked 110 on the shipment checkpoint symbol. Assuming that the pinpoint symbol is at a user desktop or user folder, it is then determined 123 whether the user is connected to the network, and if not then that connection is established 125, so that a pinpoint inquiry is sent 127 to the carrier. In response to that inquiry, the carrier ascertains 129 a pinpoint location of the shipment between checkpoints. This may be done, for example, by communicating with a delivery truck or airplane which is equipped with a global positioning satellite (GPS) device, and then the carrier can plot the GPS coordinates on a map and present 131 the map to the user. If 132 the user is provided with the pinpoint location after a delay, then the user can be compensated 133 for the delay, for example by providing the user with a monetary credit, or by providing the user with a free pinpoint click in the future.

Figure 2:
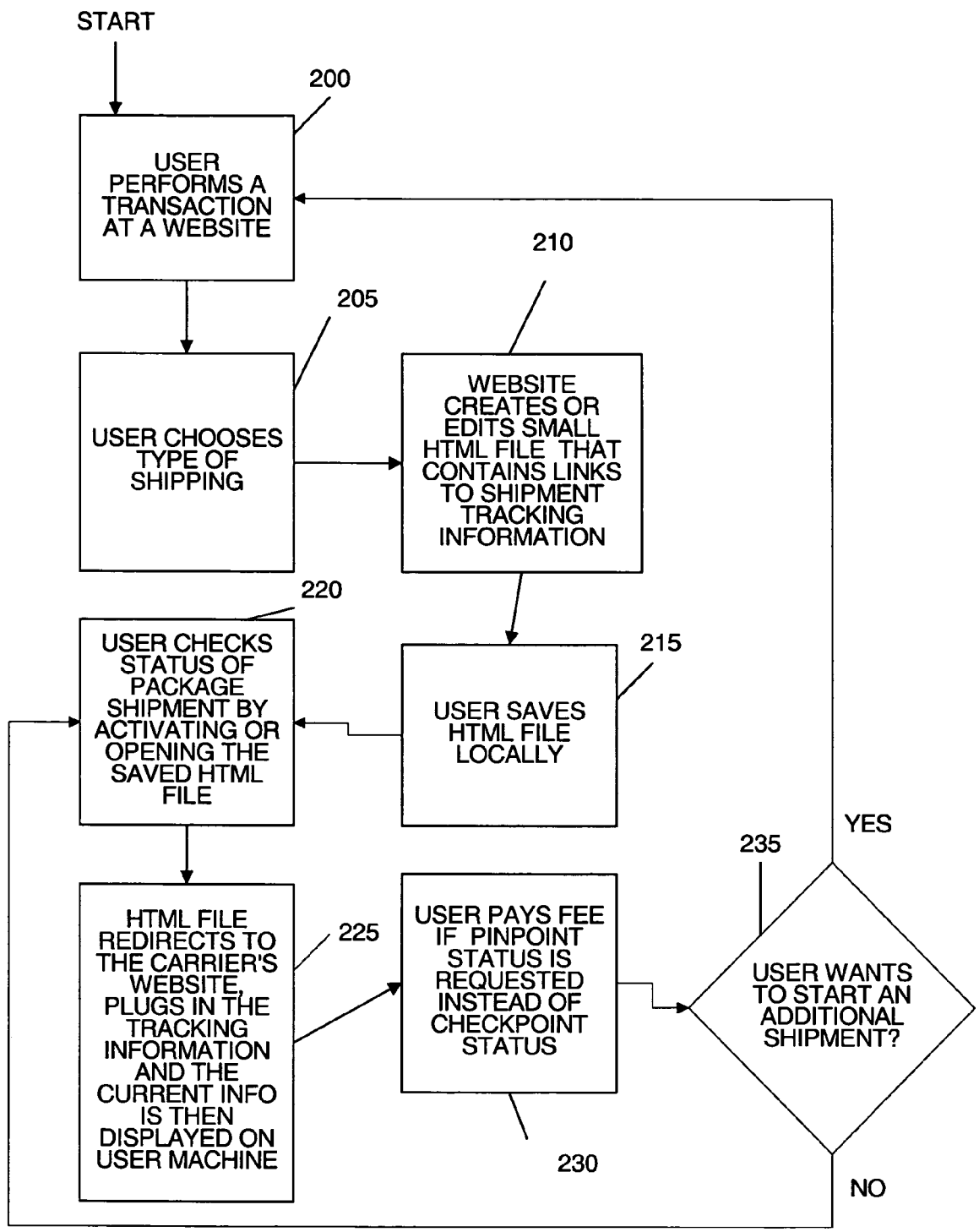
FIG. 2 is a flow chart showing how a user obtains shipping status, and does so iteratively for additional shipments.

Turning now to FIG. 2, this flow chart shows a related embodiment of the present application. A user 200 performs a transaction at a web site, such as purchasing a product, which typically includes choosing 205 a shipping method. Then the web site creates or edits 210 a small file that includes markup language, such as hypertext markup language (HTML) or extensible markup language (XML), so that the file will contain a link or links to shipment tracking information. This file is then saved locally 215 at a user device. Subsequently, the user checks the status of package shipment by activating or opening 220 the saved html file. This file redirects (i.e. routes) the user's computer to the carrier's web site, where the tracking information is plugged in so that the current information is displayed 225 on the user machine. If the user has requested pinpoint status instead of checkpoint status, then the user will pay 230 a fee. The user is able to perform these steps iteratively, if the user decides 235 to start an additional shipment.

Figure 3:
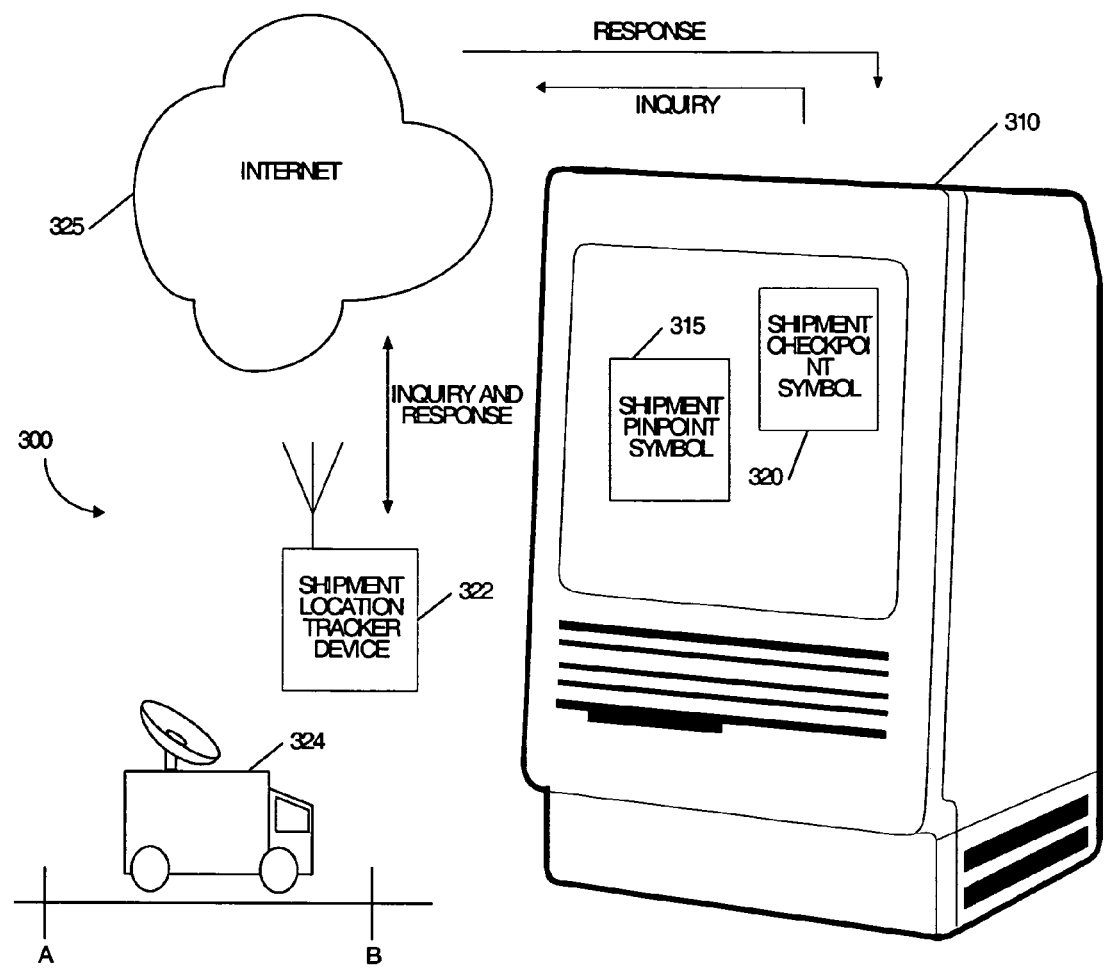
FIG. 3 shows a system for the user to click on desktop symbols to obtain pinpoint or checkpoint shipping status.

FIG. 3 illustrates a system 300 according to the present invention. The user's computer 310 displays a shipment pinpoint symbol 315 and a shipment checkpoint symbol 320. These symbols may be displayed at the user's desktop or in a user folder as an icon or other clickable item, and they may additionally be displayed at a carrier web site. In any event, the user will click on the checkpoint symbol 320 to find out the checkpoint or checkpoints at which the presence of the shipment has been detected. Or, the user will click on the pinpoint symbol 315 to actually cause the carrier to find out where the shipment (e.g. a letter, package, or any other item that can be delivered) is located between checkpoints. The carrier does this by using a shipment location tracker device 322 for contacting a delivery vehicle 324, so that the delivery vehicle will report its position between checkpoint A and checkpoint B. The delivery vehicle 324 will detect its position, for example, using a GPS unit. The shipment location tracker device 322 may be a wireless phone, radio, or other communication device. Regardless of which symbol the user clicks, the inquiry will be sent to the carrier via a network such as the internet 325, and the reply from the carrier will also be sent that way as well.

Figure 4:
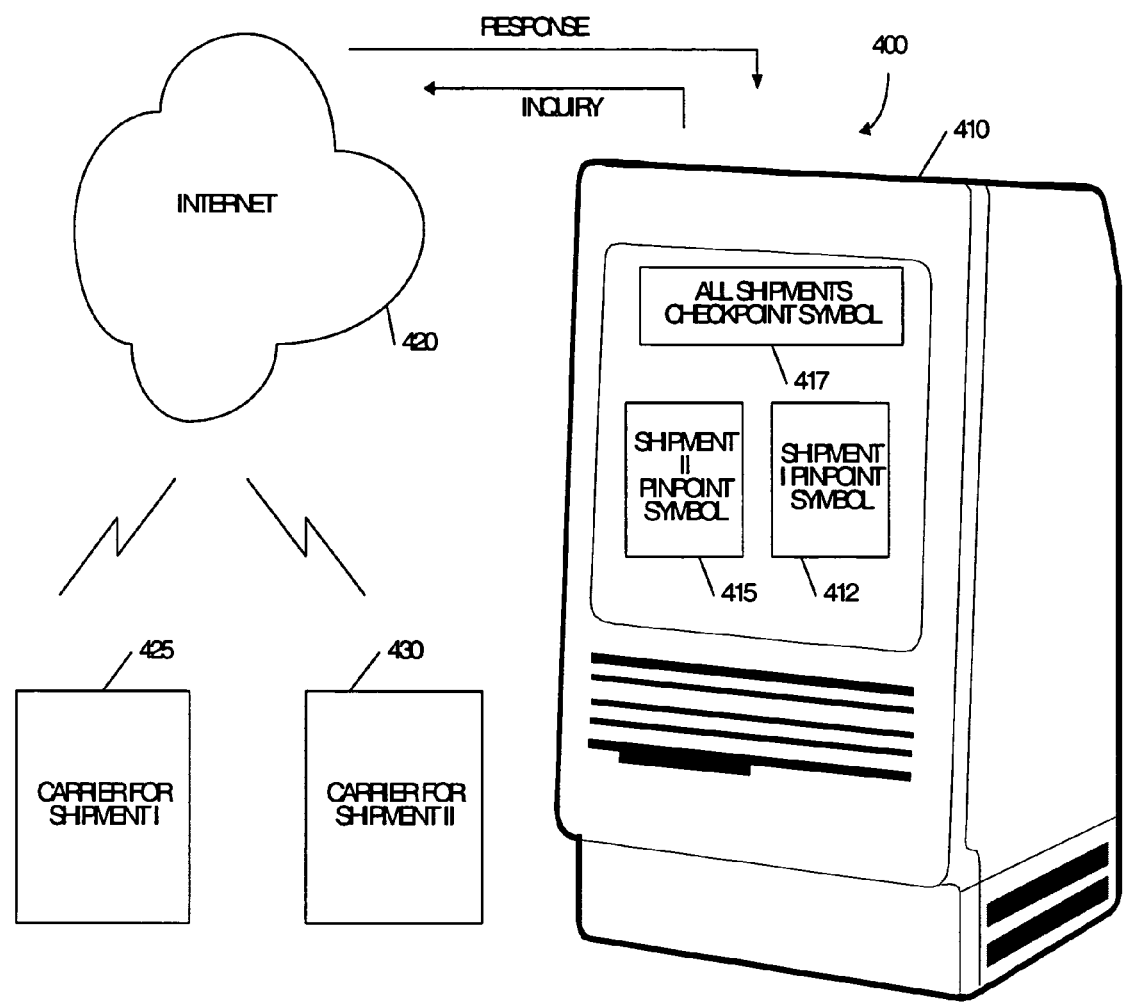
FIG. 4 shows a system for obtaining pinpoint shipping status from different carriers, and for obtaining checkpoint shipping status aggregated for all carriers.

FIG. 4 illustrates a system 400 according to the present invention, for tracking shipments that are being shipped by carriers. The user device 410 displays a pinpoint symbol 412 for a first shipment, and a pinpoint symbol 415 for a second shipment. Thus, the user can decide which pinpoint symbol to click, depending upon which shipment's precise position is desired. However, if the user merely would like to obtain a rougher idea of where all of the shipments are located in an aggregated display, the user clicks on an all shipments checkpoint symbol. As discussed, these inquiries and responses are sent via a network such as the internet 420 which in turn is in contact with the carrier 425 for the first shipment, and with the carrier 430 for the second shipment. The first carrier can be the same as the second carrier, or they can be different, and in either case the present invention provides a handy and convenient way for the user to make shipment status inquiries.

In the context of the present invention, pinpoint status means any shipment status that provides greater accuracy than checkpoint status. The checkpoint status comprises information as to whether a shipment has reached or been scanned at one or more discrete points. The carrier may be any kind of delivery company, or company that includes delivery service, or form of transportation. The shipment carried by the carrier is any physical letter, package, paper, envelope, carton, or the like. The type of shipment may be overnight, same day, priority, express, or other designation that identifies the manner in which the shipment is carried.

Various changes may be made in the above illustrative embodiments without departing from the scope of the invention, as will be understood by those skilled in the art. It is intended that all matter contained in the above description or shown in the accompanying drawings shall be interpreted as illustrative and not in a limiting sense. The invention disclosed herein can be implemented by a variety of combinations of hardware and software, and those skilled in the art will understand that those implementations are derivable from the invention as disclosed herein.

What is claimed is:

1. A method for a user to find pinpoint status of a shipment being transported by a carrier, comprising the steps of:
   clicking on a local shipment pinpoint symbol on a computer screen;
   connecting automatically to an internet or private network, if a connection is not already established;
   then, in response to clicking on the shipment pinpoint symbol, sending automatically a shipping pinpoint status inquiry to the carrier via the internet or private network;
   requesting a pinpoint location of the shipment in response to the shipping pinpoint status inquiry; and
   receiving the requested pinpoint location of the shipment to the computer screen,
   wherein the pinpoint location identifies a position between checkpoints at each of which shipment presence is monitored regardless of user inquiries.

2. The method of claim 1, wherein the shipment pinpoint symbol is an icon of a file, in a markup language, including a tracking code of the shipment.

3. The method of claim 1, wherein the shipment pinpoint symbol is provided to the computer screen in conjunction with a shipment checkpoint symbol, and
   wherein the shipment checkpoint symbol is for obtaining information as to the presence of at least one of the checkpoints.

4. The method of claim 1, wherein if the step of providing the pinpoint shipping status information to the computer screen is performed later than a certain time after the step of sending automatically the shipping pinpoint inquiry, due to a delay, then a user of the computer screen is compensated for the delay, and if the step of providing the pinpoint shipping status information to the computer screen is not performed later than a certain time after the step of sending automatically the shipping pinpoint inquiry, due to a delay, then the user of the computer screen is not compensated.

5. The method of claim 1, wherein the position is separate from all of the checkpoints.

6. A system for a user to obtain via internet or other network, a pinpoint status of a shipment being transported by a carrier, comprising;
   a server computer for providing to a user computer a clickable shipment pinpoint symbol that is stored locally and when selected by the user triggers a shipping pinpoint inquiry to a carrier; and
   a shipping location tracker device, responsive to the shipping pinpoint inquiry, for providing the pinpoint status to the user computer via the internet or private network;
   wherein the pinpoint status identifies a position between two checkpoints at each of which shipment presence is monitored regardless of user inquiries.

7. The system of claim 6, wherein the shipment pinpoint symbol is an icon of a file, in a markup language, including a tracking code of the shipment.

8. The system of claim 6, wherein the shipment pinpoint symbol is provided to the computer screen in conjunction with a shipment checkpoint symbol, and
   wherein the shipment checkpoint symbol is for obtaining information as to the presence of at least one of the checkpoints.

9. The system of claim 6, wherein the position is separate from all of the checkpoints.

\* \* \* \* \*